United States Patent [19]
Shiraishi et al.

[11] Patent Number: 4,828,904
[45] Date of Patent: May 9, 1989

[54] THERMAL IMAGE TRANSFER RECORDING MEDIUM

[75] Inventors: Shuhei Shiraishi, Mishima; Minoru Hakiri, Numazu, both of Japan

[73] Assignee: Ricoh Company, Ltd., Tokyo, Japan

[21] Appl. No.: 100,928

[22] Filed: Sep. 25, 1987

[30] Foreign Application Priority Data

Sep. 30, 1986 [JP] Japan .............................. 61-229785
Sep. 30, 1986 [JP] Japan .............................. 61-229786

[51] Int. Cl.$^4$ .............................................. B32B 7/02
[52] U.S. Cl. .................................. 428/212; 428/195; 428/206; 428/207; 428/327; 428/484; 428/488.1; 428/488.4; 428/913; 428/914
[58] Field of Search ............ 428/195, 212, 484, 488.1, 428/488.4, 913, 914, 206, 207, 327

[56] References Cited

U.S. PATENT DOCUMENTS 4,617,224 10/1986 Hotta et al. ........................ 428/215

*Primary Examiner*—George F. Lesmes
*Assistant Examiner*—P. R. Schwartz
*Attorney, Agent, or Firm*—Flynn, Thiel, Boutell & Tanis

[57] ABSTRACT

A thermal image transfer recording medium is disclosed, which comprises a substrate, a first image transfer layer formed thereon comprising as the main components styrene resin particles having a melting or softening point ranging from 75° C. to 140° C., and a wax component having a melting or softening point ranging from 70° C. to 130° C., and a second image transfer layer formed on the first image transfer layer, comprising as the main components a dye or a pigment, and adhesiveness-providing resin particles having a melting or softening point ranging from 60° C. to 110° C., and a wax component having a melting or softening point ranging from 70° C. to 130° C.

9 Claims, No Drawings

THERMAL IMAGE TRANSFER RECORDING MEDIUM

BACKGROUND OF THE INVENTION

The present invention relates to a thermal image transfer recording medium from which a thermally fused ink layer is imagewise transferred to a recording sheet, thereby recording images on the recording sheet. This recording medium may be used, for instance, with printers of computers and word processors, and bar code printers.

Conventionally, there is known a thermal image transfer recording medium which comprises a substrate and an image transfer layer formed thereon comprising a thermofusible material such as paraffin wax, and a dye or pigment. However, materials such as paraffin wax lack mechanical strength so that a thermal image transfer recording medium comprising paraffin wax has the shortcoming that images transferred from the recording medium to a recording sheet are poor in friction strength.

In ôrder to eliminate this shortcoming, it has been proposed to add a thermoplastic resin to the image transfer layer or to minimize the thickness of the image transfer layer. The former method, however, has the shortcoming that image transfer cannot be properly performed, or the thermal sensitivity of the recording medium becomes poor as the amount of the resin components in the image transfer layer increases, while the latter method has the shortcomings that the uniformity of the transferred images is poor and the image density thereof is low.

SUMMARY OF THE INVENTION

Accordingly, it is an object of the present invention to provide an improved thermal image transfer recording medium, from which the above-mentioned conventional shortcomings have been elmminated, and which is capable of yielding transferred images having high image density, high uniformity and high friction strength.

The above object of the present invention is attained by a thermal image transfer recording medium comprising a substrate, a first image transfer layer formed thereon comprising as the main components styrene resin particles having a melting or softening point ranging from 75° C. to 140° C., and a wax component having a melting or softening point ranging from 70° C. to 130° C., and a second image transfer layer formed on the first image transfer layer, comprising as the main components a dye or a pigment, and adhesiveness-providing resin particles having a melting or softening point ranging from 60° C. to 110° C., and a wax component having a melting or softening point ranging from 70° C. to 130° C.

When the thermal image transfer recording medium according to the present invention is employed in practice, it is superimposed on a recording sheet in such a manner that the second image transfer layer comes into contact with the recording sheet, and thermal printing is performed with imagewise application of heat to the back side of the recording medium, thereby forming the desired transferred images on the recording sheet.

As the materials for the substrate of the image transfer recording medium according to the present invention, a variety of conventional materials can be used. Examples of such materials for the substrate are plastic films such as polyester film, polyamide film, polyvinyl chloride film, polyethylene film, polypropylene film, polyimide film, polysulfone film and polycarbonate film, and condensor paper.

As the dye or pigment for use in the present invention, conventional inorganic or organic dyes or pigments for use in printing inks and paints can be used. Specific examples of such dyes and pigments are Carbon Black, Disazo Yellow, Brilliant Carmine 6B, Lake Red C, Phthalocyanine Blue, Kayaset Black KR (made by Nippon Kayaku Co., Ltd.), Oil Yellow 3G (made by Oriental Chemical Industries, Ltd.), Kayaset Red K-BE (made by Nippon Kayaku Co, Ltd.) and Kayaset Blue KFL (made by Nippon Kayaku Co., Ltd.).

It is preferable that the melting or softening point of the styrene resin particles for use in the first image transfer layer be in the range of 75° C. to 140° C. for obtaining high friction resistance of the transferred images, easy image fixing, high recording speed, and extended life of a thermal head for use with this recording medium.

Examples of such styrene resin particles are particles of styrene resin, styrene-acryl copolymer, styrene-methacryl copolymer, styrene-acryl-methacryl copolymer and styrene-maleic acid copolymer.

Further, it is preferable that the melting or softening point of the adhesiveness-providing resin particles for use in the second image transfer layer be in the range of 60° C. to 130° C. for preservation of the required properties of the image transfer layers during storage, and for obtaining transferred images with high uniformity.

As the materials for such adhesiveness-providing resin particles for use in the second image transfer layer, rosin-type resins such as rosin, polymerized rosin, hydrogenated rosin, rosin ester and hydrogenated rosin ester; terpene resins such as terpene resin, terpene phenol resin, aromatic modified terpene resin and rosin phenol resin; aliphatic, aromatic and alicyclic petroleum resins; and other resins such as cumarone-indene resin, alkyl phenol resin, xylene resin, and low molecular weight (average molecular weight: 1000 or less) styrene resin can be employed.

The styrene resin particles and the adhesiveness-providing resin particles for use in the present invention can be prepared by the conventional finely dividing methods such as the suspension polymerization method, the wet-type dispersing method using a sand mill, and the dry-type dispersion method using a jet mill.

It is preferable that the average particle size of these resin particles be in the range of 0.1 μm to 5 μm, more preferably in the range of about 1 μm to about 3 μm for preventing the image transfer layer from sticking to a thermal head and for obtaining high thermal sensitivity and high resolution.

In the present invention by using the styrene resin particles in the first image transfer layer, the friction resistance of the transferred images can be particularly improved. Further, by using the adhesiveness-providing resin particles in the second image transfer layer, images with high sharpness, high uniformity and high image density can be obtained.

It is preferable that the wax component for use in the present invention have a melting or softening point ranging from 70° C. to 130° C. for obtaining recorded images with high quality, with application of an appropriate amount of thermal recording energy. Further, it is preferable that the penetration of these waxes be 1 or less for obtaining appropriate scratching resistance of the recorded images. Specific examples of such wax component are carnauba wax, polyethylene wax, Fisher Tropsch Wax, montan wax derivatives and hardened castor oil.

It is preferable that the amount of these waxes be in the range of 10 wt. % to 70 wt. % of the entire solid components of the transfer layers for obtaining transferred images with high uniformity and high friction resistance.

In addition to the above-mentioned wax component, a conventional binder agent can be added to the image transfer layers in such an amount that it does not have any adverse effects on the image transfer, specifically in an amount of 0 to 25 wt. % of the entire solid components of the image transfer layers.

Specific examples of such a binder agent for use in the image transfer layers are polyvinyl alcohol, methoxycellulose, hydroxyethylcellulose, carboxymethylcellulose, polyvinyl pyrrolidone, polyacrylamide, starch, gelatin, acryl resin, methacryl resin, vinyl acetate resin, vinylchloride resin, vinylidene chloride resin, olefin resin, polyester resin and copolymers of these resins.

As the materials of a recording sheet for use with the thermal image transfer recording medium according to the present invention, for example, plain paper, synthetic paper and plastic films can be employed.

The thermal image transfer recording medium according to the present invention can be prepared as follows:

The previously mentioned components for each image transfer layer are mixed with water or a solvent in which the resin particle resins are not soluble. This mixture is dispersed in a dispersing means such as a stirrer, a ball mill, or an attritor until the average particle size of the resin particles becomes 0.1 μm to 5 μm to obtain a dispersion. The thus obtained dispersion is applied to the substrate in such a manner that the entire solid components are deposited in an amount of 1 to 10 g/$m^2$ on dry basis on the substrate. Thereafter, the applied dispersion is dried at temperatures below the melting or softening points of the resin particles. The same method as mentioned above can be applied to the formation of the first and second image transfer layers.

With reference to the following examples, the present invention will now be explained in more detail. The feature of this invention will become apparent in the course of the following description of the examples which are given for illustration of the invention and are not intended to be limiting thereof.

EXAMPLES 1-1 TO 1-6

(1) Preparation of Carbon Black Dispersion

| | Parts by Weight |
|---|---|
| Carbon Black | 20 |
| Polyoxyethylene alkyl ether (Surfactant) | 2 |
| Water | 78 |

The above components were dispersed in a ball mill for 24 hours, whereby a carbon black dispersion was prepared.

(2) Preparation of Resin Particle Dispersions A through H

In accordance with the formulations shown in the following Table 1, resin particle dispersions A through H were prepared by dispersing the components in each dispersion in a ball mill for 24 hours, so that each dispersion containing therein resin particles having an average particle size of 2 μm was obtained. The figures in the following table indicate the amount of each component by parts by weight.

TABLE 1

| | A | B | C | D | E | F | G | H |
|---|---|---|---|---|---|---|---|---|
| Polystyrene (s.p. 75° C.) | 20 | | | | | | | |
| Polystyrene (s.p. 90° C.) | | 20 | | | | | | |
| Polystyrene (s.p. 150° C.) | | | 20 | | | | | |
| Terpene Resin (s.p. 80° C.) | | | | 20 | | | | |
| Terpene Resin (s.p. 100° C.) | | | | | 20 | | | |
| Terpene Resin (s.p. 135° C.) | | | | | | 20 | | |
| Aliphatic Petroleum resin (s.p. 90° C.) | | | | | | | 20 | |
| Styrene/Acryl Resin (s.p. 90° C.) | | | | | | | | 20 |
| Polyvinyl Alcohol (10% aqueous solution) | 20 | 20 | 20 | 20 | 20 | 20 | 20 | 20 |
| Water | 60 | 60 | 60 | 60 | 60 | 60 | 60 | 60 |

(Note)
s.p.: Softening Point (3) Preparation of Image Transfer Layer Coating Liquids No. 1 through 6

Image transfer layer coating liquids No. 1 through No. 8 were prepared in accordance with the formulations as shown in the following Table 2. The figures in the following table indicate the amount of each component by parts by weight.

TABLE 2

| No. | 1 | 2 | 3 | 4 | 5 | 6 | 7 | 8 |
|---|---|---|---|---|---|---|---|---|
| Carbon Black Dispersion | 10 | 10 | 10 | 10 | 10 | 10 | 10 | 10 |
| Resin Particle Dispersions | | | | | | | | |
| A | 25 | | | | | | | |
| B | | 25 | | | | | | |
| C | | | 25 | | | | | |
| D | | | | 25 | | | | |
| E | | | | | 25 | | | |
| F | | | | | | 25 | | |
| G | | | | | | | 25 | |
| H | | | | | | | | 25 |
| Carnauba Wax Dispersion (Solid Components: 30%, m.p. 83° C.) | 15 | 15 | 15 | 15 | 15 | 15 | 15 | 15 |

(4) Preparation of Thermal Image Transfer Recording Media No. 1-1 through 1-6

Thermal image transfer recording media No. 1-1 through No. 1-6 were prepared by successively applying the first image transfer layer coating liquid and the second image transfer coating liquid in each recording medium in accordance with such combination as shown in the following Table 3.

TABLE 3

| Examples No. | 1-1 | 1-2 | 1-3 | 1-4 | 1-5 | 1-6 |
|---|---|---|---|---|---|---|
| First Image Transfer Layer Coating Liquid No. | 1 | 1 | 2 | 2 | 8 | 8 |
| Second Image Transfer Layer | 4 | 5 | 5 | 7 | 4 | 5 |

TABLE 3-continued

| Examples No. | 1-1 | 1-2 | 1-3 | 1-4 | 1-5 | 1-6 |
|---|---|---|---|---|---|---|
| Coating Liquid No. | | | | | | |

In each recording medium, the first image transfer coating liquid was applied to a polyester film having a thickness of 6 μm by a wire bar with a depostion amount of 2 $g/m^2$ on dry basis, and the applied coating liquid was dried under an air flow at the temperatures of 40° C. to 50° C., whereby a first image transfer layer was formed on the polyester film. Thereafter, the second image transfer layer coating liquid was applied to the first image transfer layer in a depostion amount of 2 $g/m^2$ on dry basis in the same manner as in the formation of the first image transfer layer and was then dried, whereby thermal image transfer recording media No. 1-1 through No. 1-6 according to the present invention were prepared.

Comparative Example 1-1

Image transfer layer coating liquid No. 4 was applied to a polyester film having a thickness of 6 μm by a wire bar with a depostion amount of 4 $g/m^2$ on dry basis, and the applied coating liquid was dried in the same manner as in Example 1-1, whereby comparative thermal image transfer recording medium No. 1-1 was prepared.

Comparative Example 1-2

Comparative Example 1-1 was repeated except that the image transfer layer coating liquid No. 4 employed in Comparative Example 1-1 was replaced by image transfer layer coating liquid No. 8, whereby comparative thermal image transfer recording medium No. 1-2 was prepared.

Comparative Examples 1-3 to 1-5

Comparative image transfer recording media No. 1-3 through 1-5 were prepared by applying the first image transfer layer coating liquid and the second image transfer layer coating liquid successively to the same substrate as that employed in Example 1-1 in each recording medium in accordance with the combination shown in the following Table 4, followed by drying the applied first and second image transfer layer coating liquids in the same manner as in Example 1-1.

TABLE 4

| Comparative Examples No. | 1-3 | 1-4 | 1-5 |
|---|---|---|---|
| First Image Transfer Layer Coating Liquid No. | 3 | 5 | 2 |
| Second Image Transfer Layer Coating Liquid No. | 4 | 1 | 6 |

Each of the above prepared thermal image transfer recording media Nos. 1-1 through 1-6 and comparative thermal image transfer recording media No. 1-1 through 1-5 was superimposed on a sheet of high quality paper in such a manner that the top (second) image transfer layer came into contact with the paper, and thermal printing was conducted by a thermal transfer printer with application of thermal energy in an amount of 0.7 mJ/dot to the back side of the image transfer recording medium.

The friction resistance of the printed images to a corrugated fibreboard was inspected by Rub Tester (made by Toyo Seiki Co., Ltd.) and the scratching resistance of the printed images was also inspected by Pen Scanner for bar-code reading at the temperatures of 20° C. to 50° C.

In addition, the image density was inspected by measuring the reflected density of solid image portion of the printed images by a Macbeth densitometer.

Further, the uniformity of the printed images was also checked by visually inspecting the presence of non-transferred portions (void portions) in the solid image portions.

The uniformity of the printed images was evaluated with the following three ranks: (1) no void portions observed (marked by o in Table 5), (2) slight void portions observed (marked by Δ in Table 5), and (3) Many void portions observed (marked by x in Table 5).

The friction resistance and the scratching resistance of the printed images were inspected and evaluated under the following conditions:

The friction resistance was inspected by rubbing the printed images against a corrugated fibreboard reciprocatingly 100 times with application of a load of 100 $g/m^2$.

The friction resistance was evaluated with the following three ranks. (1) No changes in the images (marked by o in Table 5), (2) the printed ink was slightly scraped off the printed portions and slightly adhered to the non-printed portions (marked by Δ in Table 5), and (3) the printed ink considerably scraped off the printed portion and adhered to the non-printed portions (marked by x in Table 5).

The scratching resistance of the printed images was inspected by rubbing a pen scanner for bar-code reading against the printed images to see how much printed ink was scraped off the printed images.

The scratching resistance was evaluated by the following three ranks. (1) No changes (marked by o in Table 5), (2) the printed ink was slightly scraped off the printed portions (marked by Δ in Table 5) and (3) the printed ink was scraped off from the printed portion and adhered to the non-printed portions (marked by x in Table 5).

TABLE 5

| | Image | | Friction Resistance | | Scratching |
|---|---|---|---|---|---|
| | Density | Uniformity | 20° C. | 50° C. | Resistance |
| Examples | | | | | |
| 1-1 | 1.90 | o | o | o | o |
| 1-2 | 1.85 | o | o | o | o |
| 1-3 | 1.80 | o | o | o | o |
| 1-4 | 1.80 | o | o | o | o |
| 1-5 | 1.90 | o | o | o | o |
| 1-6 | 1.80 | o | o | o | o |
| Comp. Examples | | | | | |
| 1-1 | 1.80 | o | x | x | x |
| 1-2 | 1.50 | x | o | o | o |
| 1-3 | 1.70 | Δ | Δ | Δ | Δ |
| 1-4 | 1.90 | o | Δ | x | x |
| 1-5 | 1.40 | x | x | x | x |

According to the present invention, thermal image transfer recording media capable of yielding printed images with high density, high uniformity, high friction resistance, and high scratching resistance, can be obtained.

The same object as that of the present invention can also be attained by a thermal image transfer recording medium comprising (i) a substrate and (ii) an image transfer layer formed thereon which comprises solid solution particles comprising as the main components a resin having a melting or softening point ranging from 60° C. to 130° C., a wax component having a melting or softening point ranging from 70° C. to 130° C., a dye or pigment, and a binder agent.

When this thermal image transfer recording medium is employed in practice, it is superimposed on a recording sheet in such a manner that the image transfer layer comes into contact with a recording sheet, and thermal printing is performed with imagewise application of heat to the back side of the recording medium, thereby forming the desired transferred images on the recording sheet.

As the materials for the substrate of the image transfer recording medium, a variety of conventional materials can be used. Examples of such materials for the substrate, plastic films such as polyester film, polyamide film, polyvinyl chloride film, polyethylene film, polypropylene film, polyimide film, polysulfone film, and polycarbonate film, and condenser paper.

As the resin for use in the above-mentioned solid solution particles, a variety of resins having a melting or softening point ranging from 60° C. to 130° C. determined in accordance with Japanese Industrial Standard K 2531. Specific examples of such resin are acryl resin, methacryl resin, styrene resin, vinyl acetate resin, vinyl chloride resin, vinylidene chloride resin, petroleum resin, novolak resin, olefin resin, polyester resin, epoxy pre-polymer and copolymers of the above resins.

It is preferable that the melting or softening point of the wax component for use in the solid solution particles be in the range of 70° C. to 130° C. Examples of such wax component are candelilla wax, carnauba wax, rice wax, montan wax, ozocerite, ceresine, paraffin wax, microcrystalline wax, petrolactam, polyethylene wax, montan wax derivatives, paraffin wax derivatives, and microcrystalline wax derivatives.

It is preferable that the mixing ratio of the resin to the wax component be 1 part by weight to about 0.2 to 2 parts by weight for obtaining printed images with high uniformity and high friction resistance.

It is preferable that the average particles size of the solid solution particles be in the range of 0.1 to 5 μm, more preferably in the range of about 1 to 3 μm for minimizing sticking of the printed images to a thermal head and maximizing the thermal sensitivity and the resolution of the printed images.

As the dye or pigment for use in the above thermal image transfer recording medium, conventional inorganic or organic dyes or pigments for use in printing inks and paints can be used. Specific examples of such dyes and pigments are Carbon Black, Disazo Yellow, Brilliant Carmine 6B, Lake Red C, Phthalocyanine Blue, Kayaset Black KR (made by Nippon Kayaku Co., Ltd.), Oil Yellow 3G (made by Oriental Chemical Industries), Kayaset Red K-BE (made by Nippon Kayaku Co., Ltd.), and Kayaset Blue KFL (made by Nippon Kayaku Co., Ltd.).

As the binder agent for use in the image transfer layer of the above thermal image transfer recording medium, a variety of water soluble resins can be used. The amount of such binder agent for use in the image transfer layer should be minimized to avoid adverse effect on the image transfer. Generally, it is preferable that the amount of binder agent in the image transfer layer be in the range of 2 to 25 wt. % of the entire solid components of the image transfer layer.

Examples of such binder agent are polyvinyl alcohol, methoxycellulose, hydroxyethylcellulose, carboxymethylcellulose, polyvinyl pyrrolidone, polyacryl amide, starch and gelatin.

As the materials of recording sheet for use with the thermal image transfer recording medium, plain paper, synthetic paper and plastic films can be employed.

The thermal image transfer recording medium can be prepared as follows.

The previously mentioned resin and wax component are heated until the mixture is fused to become homogeneous. The fused mixture was then cooled to obtain a solid solution. The thus obtained solid solution is crushed and dispersed in a sand mill, a ball mill or jet mill until its average particle size becomes 0.1 to 5 μm, together with the above-mentioned binder agent, the dye or pigment and a dispersing liquid to obtain dispersion. The dispersion is then applied to a substrate in such a manner that the entire solid components are deposited in an amount of 1 to 10 $g/m^2$ on dry basis on the substrate. Thereafter the applied dispersion is dried at temperatures below the melting or softening point of the solid solution particles, for example, at temperatures below 50° C.

The following are examples of the above mentioned thermal image transfer recording medium.

Examples 2-1 to 2-3 (1) Preparation of Solid Solution Particle Dispersions (A), (B) and (C)

Solid Solution Particle Dispersion (A)

| | Parts by weight |
|---|---|
| Polystyrene (s.p. 80° C.) | 12 |
| Carnauba wax (m.p. 83° C.) | 8 |

The above components were heated until the mixture was fused and became homogeneous. The mixture was then cooled to room temperature to obtain a solid solution.

20 parts by weight of the thus obtained solid solution, 10 parts by weight of a 10% aqueous solution of polyvinyl alcohol, and 70 parts by weight of water were dispersed in a ball mill for 24 hours, whereby a solid solution particle dispersion (A) containing solid solution particles having an average particle size of 3 μm was obtained.

Solid Solution Particle Dispersion (B)

Solid solution particles dispersion (B) was prepared in the same manner as in the above-mentioned solid solution particles dispersion (A) with the following formulation:

| | Parts by weight |
|---|---|
| Styrene/acryl resin (s.p. 100° C.) | 10 |
| Rice wax (m.p. 80° C.) | 10 |

Solid Solution Particle Dispersion (C)

Solid solution particles dispersion (C) was prepared in the same manner as in the solid solution particles dispersion (A) with the following formulation:

| | Parts by weight |
|---|---|
| Petroleum resin (s.p. 70° C.) | 10 |
| Polyethylene wax (m.p. 128° C.) | 10 |

(2) Preparation of Carbon Black Dispersion

A mixture of the following components was dispersed in a ball mill for 24 hours, whereby a carbon black dispersion was prepared.

| | Parts by weight |
|---|---|
| Carbon Black | 20 |
| Polyoxyethylene alkyl ether (Surfactant) | 2 |
| Water | 78 |

(3) Preparation of Image Transfer Layer Coating Liquids No. 1 through No. 3

In accordance with the formulations shown in the following Table 6, image transfer layer coating liquids No. 1 through No. 3 were prepared. The figures in the following table indicate the amount of each component by parts by weight.

TABLE 6

| Image Transfer Layer Coating Liquids No. | | 1 | 2 | 3 |
|---|---|---|---|---|
| Carbon Black Dispersion | | 10 | 10 | 10 |
| Solid Solution Particle | (A) | 100 | | |
| Dispersions | (B) | | 100 | |
| | (C) | | | 100 |
| Polyvinyl alcohol (10% aqueous solution) | | 10 | 10 | 10 |

(5) Preparation of Thermal Image Transfer Recording Media No. 2-1 through No. 2-3

Thermal image transfer recordihg media No. 2-1 through No. 2-3 were prepared by applying the image transfer layer coating liquid No. 1 through No. 3 respectively to a polyester film having a thickness of 6 μm by a wire bar with a deposition amount of 4 g/$m^2$ on dry basis, and each applied coating liquid was dried under an air flow at 40 to 50° C.

Comparative Example 2-1

A mixture of the following components was fused at 100° C. in a ball mill and uniformly dispersed. Thereafter, the dispersion was applied by a hot melt coater with a deposition amount of 4 g/$m^2$ to a polyester film having a thickness of 6 μm, whereby a comparative thermal image transfer recoding medium No. 2-1 was prepared.

| | Parts by weight |
|---|---|
| Polystyrene (s.p. 80° C.) | 12 |
| Carnauba wax (m.p. 83° C.) | 8 |
| Carbon black | 2 |

Comparative Example 2-2

A mixture of the following components was fused at 130° C. in a ball mill and uniformly dispersed. Thereafter, the dispersion was applied by a hot melt coater with a deposition amount of 4 g/$m^2$ to a polyester film having a thickness of 6 μm, whereby a comparative thermal image transfer recoding medium No. 2-2 was prepared.

| | Parts by weight |
|---|---|
| Styrene/acryl resin (s.p. 100° C.) | 10 |
| Rice wax (m.p. 80° C.) | 10 |

-continued

| | Parts by weight |
|---|---|
| Carbon black | 2 |

Comparative Example 2-3

A mixture of the following components was dispersed in a ball mill for 24 hours, whereby an image transfer coating liquid was prepared:

| | Parts by weight |
|---|---|
| Petroleum resin (s.p. 70° C.) | 10 |
| Polyethylene wax (s.p. 128° C.) | 10 |
| Carbon black | 2 |
| Toluene | 80 |

The above prepared image transfer coating liquid was applied to a polyester film having a thickness of 6 μm by a wire bar with a deposition amount of 4 g/$m^2$ on dry basis. The applied coating liquid was dried under an air flow at 100° C., whereby comparative thermal image transfer recording medium No. 2-3 was prepared.

Each of the above prepared thermal image transfer recording media Nos. 2-1 through 2-3 and comparative thermal image transfer recording media No. 2-1 through 2-3 was superimposed on a sheet of high quality paper in such a manner that the image transfer layer comes into contact with the paper and thermal printing was conducted by a thermal transfer printer with application of a thermal energy of 0.7 mJ/dot on the back side of the image transfer recording medium. The friction resistance of the printed images to a corrugated fibreboard was inspected by Rub Tester (made by Toyo Seiki Co., Ltd.) and the scratching resistance of the printed images was also inspected by pen scanner for bar-code reading at temperatures of 20° C. to 50° C.

In addition, the image density was inspected by measuring the reflected density of solid image portion of the printed images by a Macbeth densitometer.

Further, the resolution of the printed images, in particular, the clear-cut sharpness of the boundaries between image areas and non-image areas, was also checked by visually inspecting the presence of a non-transferred portions (void portions) in the solid image portions. The resolution of the printed images was evaluated with the following three ranks: (1) Clear-cut boundaries (marked by o in Table 7), and (2) non-clear-cut boundaries (marked by x in Table 7).

The friction resistance and the scratching resistance of the printed images were inspected and evaluated under the following conditions:

The friction resistance was inspected by rubbing the printed images against corrugated fibreboard reciprocatingly 100 times with application of a load of 100 g/$m^2$.

The friction resistance was evaluated with the following two ranks. (1) No changes in the image (marked by o in Table 7), and (2) the printed ink considerably scraped off the printed portion and adhered to the non-printed portions (marked by x, if any).

The scratching resistance of the printed images was inspected by rubbing a pen scanner for bar-code reading against the printed images to see how much printed ink was scraped off the printed images.

The scratching resistance was evaluated by the following two ranks. (1) No changes (marked by o in Table 7), and (2) the printed ink was scraped off from the printed portion and adhered to the non-printed portions and line images became imperfect (marked by x, if any).

TABLE 7

| No. | Examples 1 | 2 | 3 | Comp. Examples 1 | 2 | 3 |
|---|---|---|---|---|---|---|
| Image Density | 1.9 | 1.8 | 1.8 | 1.8 | 1.9 | 1.7 |
| Resolution of the Printed Images | o | o | o | x | x | x |
| Friction Resistance 20° C. | o | o | o | o | o | o |
| Friction Resistance 50° C. | o | o | o | o | o | o |
| Scratching Resistance | o | o | o | o | o | o |

What is claimed is:

1. A thermal image transfer recording medium comprising:
   - a substrate,
   - a first image transfer layer formed thereon comprising as the main components styrene resin particles having a melting or softening point ranging from 75° C. to 140° C., and a wax component having a melting or softening point ranging from 70° C. to 130° C., and
   - a second image transfer layer formed on said first image transfer layer, comprising as the main components a dye or a pigment, and adhesiveness-providing resin particles having a melting or softening point ranging from 60° C. to 110° C., and a wax component having a melting or softening point ranging from 70° C. to 130° C.

2. The thermal image transfer recording medium as claimed in claim 1, wherein said styrene resin particles are particles of a resin selected from the group consisting of styrene homopolymer resin, styrene-acryl copolymer, styrene-methacryl copolymer, styrene-acryl-methacryl copolymer and styrene-maleic acid copolymer.

3. The thermal image transfer recording medium as claimed in claim 1, wherein said wax component in said first image transfer layer and said second image transfer layer is selected from the group consisting of carnauba wax, polyethylene wax, Fisher Tropsch Wax, montan wax derivatives and hardened castor oil.

4. The thermal image transfer recording medium as claimed in claim 1, wherein said adhesiveness-providing resin particles are particles of a resin selected from the group consisting of rosin, terpene resin, aliphatic petroleum resin, aromatic petroleum resin, alicyclic petroleum resin, cumarone-indene resin, alkyl phenol resin, xylene resin, and low molecular weight (average molecular weight: 1000 or less) styrene resin.

5. The thermal transfer recording medium as claimed in claim 4, wherein said rosin resin is selected from the group consisting of, unmodified rosin, polymerized rosin, hydrogenated rosin, rosin ester, and rosin phenol resin.

6. The thermal transfer recording medium as claimed in claim 5 wherein said rosin ester is an hydrogenated rosin ester.

7. The thermal transfer recording medium as claimed in claim 4, wherein said terpene resin is selected from the group consisting of unmodified terpene resin, terpene phenol resin, and aromatic modified terpene resin.

8. The thermal image transfer recording medium as claimed in claim 1, wherein said styrene resin particles have an average particle size ranging from 0.1 μm to 5 μm.

9. The thermal image transfer recording medium as claimed in claim 1, wherein said adhesiveness-providing resin particles have an average particle size ranging from 0.1 μm to 5 μm.

* * * * *